(12) United States Patent
Lindgren

(10) Patent No.: US 11,116,188 B2
(45) Date of Patent: *Sep. 14, 2021

(54) AQUACULTURE NET CLEANING SYSTEM

(71) Applicant: Peter B. Lindgren, Pompano Beach, FL (US)

(72) Inventor: Peter B. Lindgren, Pompano Beach, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/151,369

(22) Filed: Oct. 4, 2018

(65) Prior Publication Data

US 2019/0037815 A1 Feb. 7, 2019

Related U.S. Application Data

(63) Continuation-in-part of application No. 15/760,493, filed as application No. PCT/US2016/031988 on May 12, 2016, now Pat. No. 10,918,199.

(60) Provisional application No. 62/160,319, filed on May 12, 2015.

(51) Int. Cl.
*A01K 63/10* (2017.01)
*A01K 61/60* (2017.01)
(Continued)

(52) U.S. Cl.
CPC .............. *A01K 63/10* (2017.01); *A01K 61/60* (2017.01); *B08B 3/104* (2013.01); *B08B 7/02* (2013.01); *B08B 7/04* (2013.01); *F04D 3/005* (2013.01); *F04D 29/181* (2013.01); *F04D 29/2288* (2013.01); *F04D 29/2294* (2013.01); *F04D 29/528* (2013.01); *F04D 29/669* (2013.01); *B08B 1/04* (2013.01)

(58) Field of Classification Search
CPC ..... E04H 44/16; E04H 44/1654; B63B 59/06; B63B 59/08; B63B 59/10; A46B 13/008; A47L 11/4011; A47L 2201/06; A01K 63/10; A01K 63/60; B08B 3/104; B08B 7/02; B08B 7/04; B08B 1/04; F04D 3/005; F04D 29/181; F04D 29/2288; F04D 29/2294; F04D 29/528; F04D 29/669
USPC .............. 15/1.7, 40, 52, 93.1; 119/232, 264; 405/3; 114/222
See application file for complete search history.

(56) References Cited

U.S. PATENT DOCUMENTS 3,628,489 A 12/1971 Michaelsen
4,084,535 A 4/1978 Rees
(Continued)

FOREIGN PATENT DOCUMENTS

EP 0131987 1/1985
JP S5662188 5/1981
(Continued)

*Primary Examiner* — Michael D Jennings
*Assistant Examiner* — Alberto Saenz
(74) *Attorney, Agent, or Firm* — McHale & Slavin, P.A.

(57) ABSTRACT

An apparatus for cleaning nets underwater formed from a propeller housing with a centrally disposed axis with a plurality of blades extending therefrom. An outer perimeter ring secured to an outer tip of each blade with a plurality of knuckles secured to the outer perimeter ring. Each knuckle including a curved surface constructed and arranged to be forcefully presented to the aquaculture net upon rotation of said blades for removal of growth by impact and shaking of the aquaculture net. An elastomeric hub prevents spike loads.

12 Claims, 9 Drawing Sheets

(51) Int. Cl.
  *B08B 3/10* (2006.01)
  *B08B 7/04* (2006.01)
  *B08B 1/04* (2006.01)
  *F04D 29/18* (2006.01)
  *F04D 3/00* (2006.01)
  *F04D 29/52* (2006.01)
  *F04D 29/66* (2006.01)
  *B08B 7/02* (2006.01)
  *F04D 29/22* (2006.01)

(56) References Cited

U.S. PATENT DOCUMENTS

| | | | |
|---|---|---|---|
| 4,193,228 A * | 3/1980 | Bowler | B24B 23/026 15/1.7 |
| 4,252,081 A | 2/1981 | Smith | |
| 4,493,125 A | 1/1985 | Collis | |
| 4,566,855 A | 1/1986 | J Constabile | |
| 4,838,193 A | 6/1989 | van der Tak | |
| 4,970,747 A | 11/1990 | Pastore | |
| 6,070,547 A | 6/2000 | Achord | |
| 8,635,730 B2 | 1/2014 | Heard | |
| 2009/0173677 A1 | 7/2009 | Seura | |
| 2012/0260443 A1* | 10/2012 | Lindgren | A46B 13/02 15/77 |

FOREIGN PATENT DOCUMENTS

| | | |
|---|---|---|
| JP | 08228641 | 9/1996 |
| JP | 099818 A | 1/1997 |
| JP | 09044238 A | 2/1997 |
| JP | 10035587 A | 2/1998 |
| WO | WO2013126359 | 8/2013 |
| WO | WO2016183274 | 11/2016 |

* cited by examiner

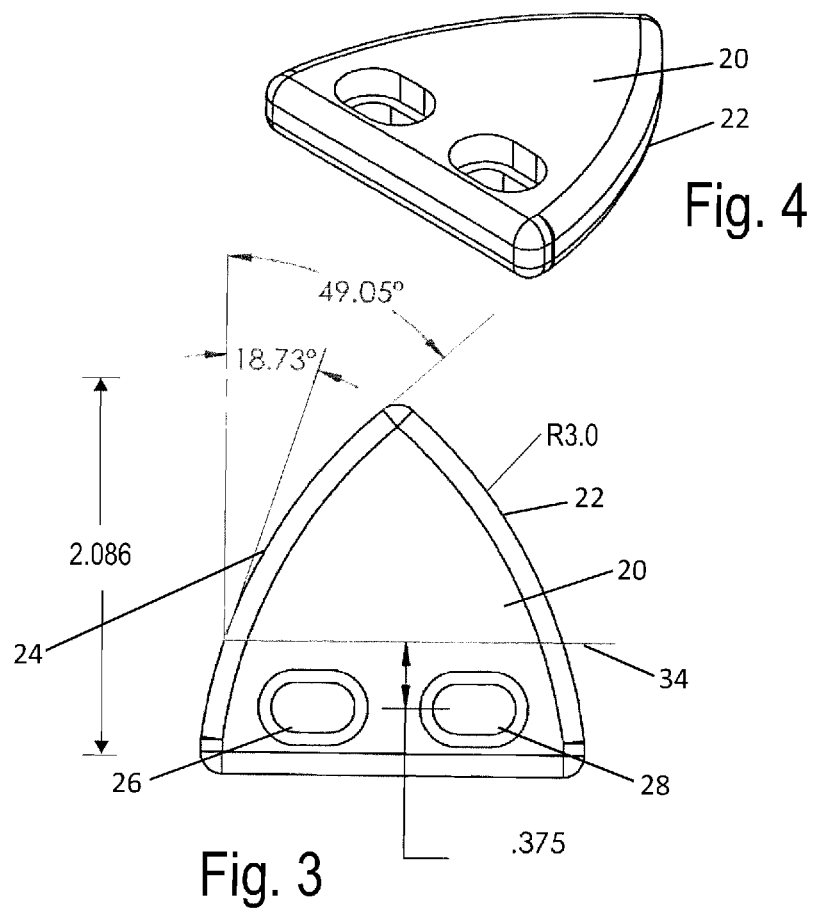

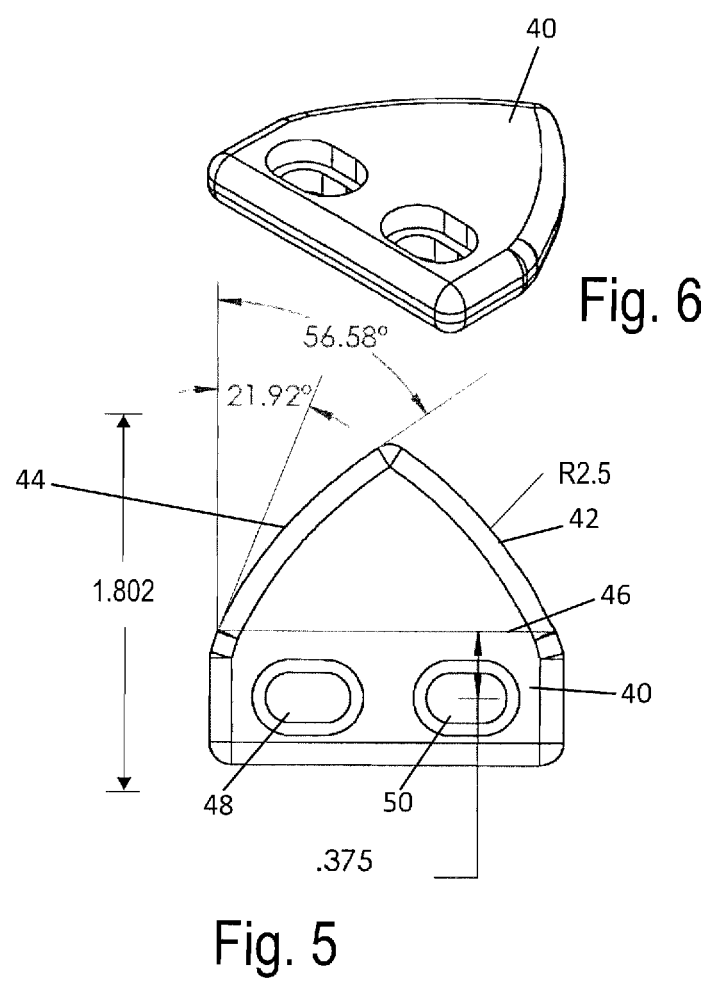

AQUACULTURE NET CLEANING SYSTEM

PRIORITY CLAIM

In accordance with 37 C.F.R. § 1.76, a claim of priority is included in an Application Data Sheet filed concurrently herewith. Accordingly, the present invention is a continuation-in-part of U.S. patent application Ser. No. 15/760,493, entitled "SUBMERGED NET CLEANER", filed Mar. 15, 2018, which is a 35 U.S.C. 371 of International (PCT) Patent Application No. PCT/US2016/031988, entitled "SUBMERGED NET CLEANER", filed May 12, 2016, which claims priority to U.S. Provisional Patent Application No. 62/160,319, entitled "SUBMERGED NET CLEANER", filed May 12, 2015. The contents of which the above referenced applications are incorporated herein by reference.

FIELD OF THE INVENTION

This invention is related to the field of open ocean aquaculture and, in particular, to aquaculture net cleaning knuckles.

BACKGROUND OF THE INVENTION

Fish farming, often called aquaculture in offshore ocean environments, is responsible for a large part of fish supply for human consumption. Feed is the largest cost of fish farming. Cleaning marine fouling from or replacing nets to maintain good water flow and healthy conditions is often the second largest cost of offshore fish farming. During winter months cleaning may be required only every 2 months. Durings summer months cleaning may be needed every 10 to 15 days and growth can easily get out of control risking proper water flow, reduced disolved oxygen, slower growth and increased mortalities.

Ocean fish farms are often placed in areas with predators like sharks, sea lions and seals. Not all locations have predator problems. In these areas a predator net is commonly used to keep predators at a distance of at least 1 to 2 meters away from grow out nets. The nets that need to be cleaned are deployed vertically below the floating rim with weighs attached at the lowest vertical point of the net, and a bottom net attached horizontally to the vertically net.

In some applications the predator nets are weighted to oppose water currents and predator attacks. For instance, seals and sea lions will swim into predator nets and push the net to the grow out net and bite a fish if the predator net is not tight enough or if the animal is powerful enough.

Predator nets usually have a mesh of about 3 to 4 inch square holes sufficient to prevent predators from entering the fish farm. Grow out nets have much smaller mesh and may have square or hexagonal openings of ½ to ½" across. When net systems are weighted the strands of the predator nets are much higher due to the fewer strands to support the weight and commonly have larger weights to repel the animals. The present invention will clean both grow out nets and predator nets, but predator nets can have the additional problems of structures including hard floats, frames, anchor chains, net weights and hard debris.

Fish grow out nets must be kept clean to assure new water flow to maintain sufficient dissolved oxygen content for fish growth and health. In the past nets were treated with poison antimicrobials to reduce fouling growth. The antifouling use is not allowed on most fish farms today more than doubling the frequency of net cleaning. Today increased net maintenance demands are required due to eliminating the use of antifouling chemical, increased concerns from disease, sea lice parasites and higher seal and sea lion density. Increased farm densities amplify the problems and every effort is being made to improve net design and provide maintenance of nets.

Lindgren WO 2016/183274A1 discloses a net cleaning system designed to clean grow out nets including elastomeric fingers and knuckles turning on the perimeter of propellers. The system works well on grow out nets including knuckles where the net weight is supported by more strands. For predator nets with larger mesh higher strand tension requires higher cleaning energy and spike loading from tighter nets, and impact on cage structures is not acceptable for net life or the equipment and special designs are required. The increased loads also reduce the speed of the equipment and therefore slower cleaning. Elimination of Spike loads allows for more aggressive cleaning while protecting the net and equipment.

Peak loads can be reduced in the current invention in two ways. With knuckle designs that are suitable for the nets and tension applied. And with the use of specialty designed flexible drive coupling. The spike rotational loads are designed using urethane rubber or other elastomeric couplings between the first driven hub. The current requirement needs a coupling to take both rotational and perpendicular spikes in a small envelope of the propeller mounting hub. Ideally the elastomeric hub is designed to absorb rotational impact as well as allow movement perpendicular to the net or obstruction. The hub has special requirements because of the applied torque of 50 to 100 ft. lbs. applied and peak loads from impact many times larger, and the small envelope available for placement. Also required is the ability to remove the hub from the propeller to replace it without requiring a new and costly propeller. Obstructions can be anchor chains, parts of the floating frame of the cage or weighting at the lower edge of the net. Suitable elastomers from 70 to 85 A shore have been tested successfully with inner diameter of inches and outer diameter of 5.5 inches and flexible element thickness of 0.1 at the O.D. to 1 ¼ inch at the I.D. Also unique in the flexible hub is the concave surface in the flexible element configured to allow additional flexibility parallel to the axis when the propeller hits obstructions. Central to the flex element is a concave radius of 0.312 inches formed at a 4.25 inch diameter from each side providing flexibility parallel to the axis. The torque suitability and perpendicular flex is also affected by the choice of hardness or durometer and adjustment of the dimensions described.

Many flexible couplings have been designed in the past. One common use is propellers with rubber hubs for use with boat propulsion such as outboard motors and stern drives. Such couplings are not field replaceable and are made to slip on impact with limited movement that is parallel to a drive shaft. Also are couplings made by Lov Joy and others for engine and motor drives suitable for rotational loads and small misalignment. None of them are designed for repeated angular displacement of 15 degrees or more, fit in small envelope and designed for easy maintenance and severe overloads. Many have splined shafts to slip or disengage parallel to the shaft while providing torque and thrust.

Known prior art net cleaners include Patent U.S. Pat. Nos. 3,628,489; 4,084,535; 4,252,081; 4,493,125; 4,838,193; 4,970,747; 6,070,547; 8,635,730; JP08-228614; JP409009818A; JP409044238A; JP410035587A.

SUMMARY OF THE INVENTION

An apparatus for cleaning nets underwater comprising at least one propeller housing with a centrally disposed axis with a plurality of blades extending therefrom. An outer perimeter ring secured to an outer tip of each blade with a plurality of knuckles secured to the outer perimeter ring. Each knuckle including a surface constructed and arranged to be forcefully presented to the aquaculture net upon rotation of said blades for removal of growth by impact friction and shaking of the aquaculture net and water flow. The cleaning head is positioned against the surface of an underwater net wherein the cleaning features are constructed and arranged to remove soft and hard growth from the nets. The knuckles have angles measured from tangent to a curved surface and a line perpendicular to its base with changes from above 20 degrees to over 45 degrees. The curved surface approximates a radius of over 2 inches and less than 7 inches.

An objective of the invention is to provide cleaning knuckles having an improved efficiency and rotational speeds for better cleaning of a net.

Still another objective of the invention is to provide improved knuckles that allows for the development of smaller lighter systems with improved cleaning.

Another objective of the invention is to teach a knuckle curved surface that can be calculated by a cosine angle parallel to a net face and a sine angle perpendicular to the net face.

Yet still another objective of the invention is to provide a net cleaning device that includes options to maximize performace based on net mesh size and the type of fouling.

Still another objective of the invention is to provide an aquaculture net cleaning system wherein knuckles are not symmetrical.

Yet another objective of the invention is to provide flexible and changeable coupling that will reduce spike loads in both the rotational and paralled to the axis direction extending the life of equipment allowing lighter more efficient operation.

Other objectives and further advantages and benefits associated with this invention will be apparent to those skilled in the art from the description, examples and claims which follow. In combination the articulated knuckle designs with the elastomeric coupling opens the design window for improved cleaning with less power and wear on the net and equipment.

BRIEF DESCRIPTION OF THE DRAWINGS

FIG. 3 is a front plane view of a first embodiment knuckle;

FIG. 4 is a perspective view of FIG. 3;

FIG. 5 is a front plane view of a second embodiment knuckle;

FIG. 6 is a perspective view of FIG. 5;

DETAILED DESCRIPTION OF THE PREFERRED EMBODIMENT

A detailed embodiment of the instant invention is disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
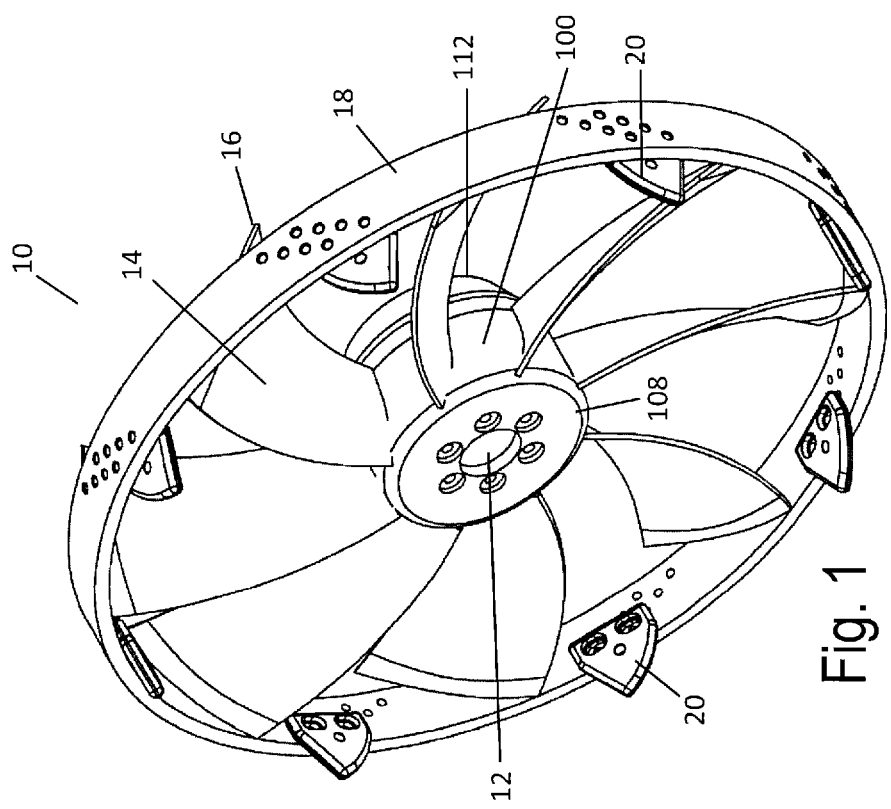
FIG. 1 is a perspective view of the aquaculture net cleaning system propeller housing with knuckles secure to a perimeter ring.
Figure 2:
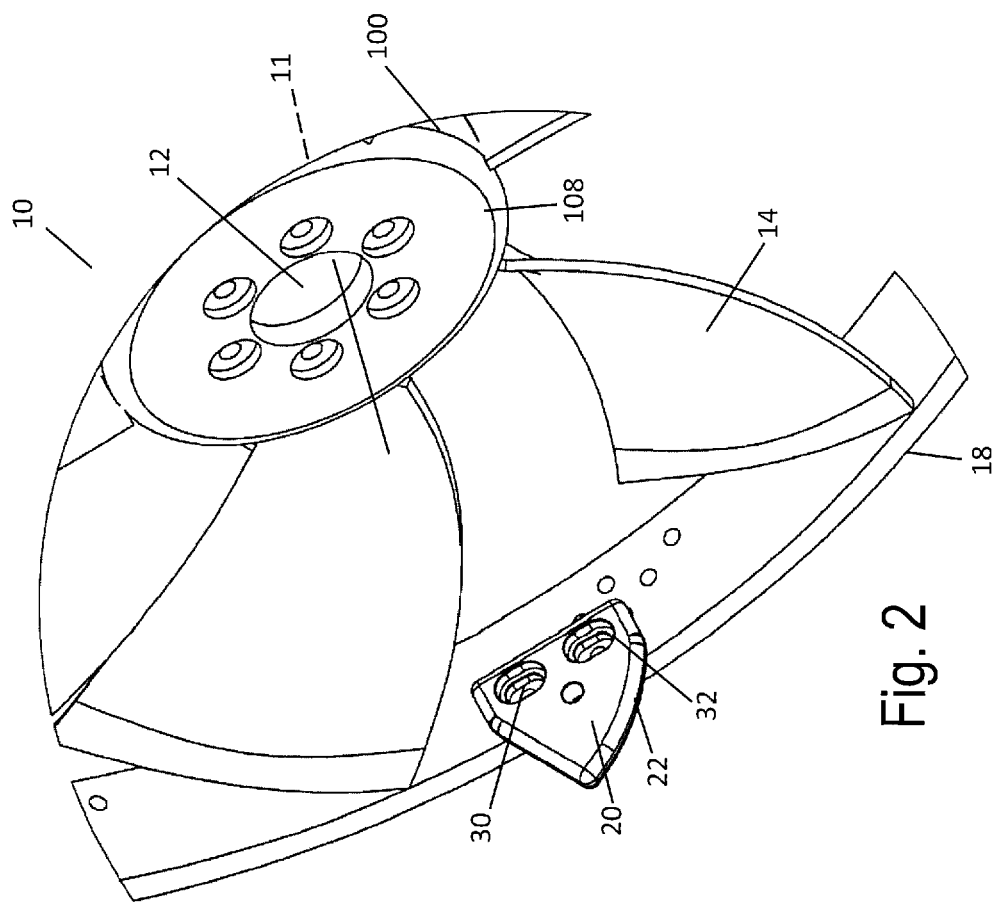
FIG. 2 is an enlarged view of a portion of FIG. 1.

FIGS. 1 and 2 depict an aquaculture net cleaning system technology comprising a propeller housing 10 with a centrally disposed axis 11 for rotation of an elastomeric hub 12 with a plurality of blades 14 extending from the elastomeric hub 12 to an outer tip 16 of each blade. An outer perimeter ring 18 is secured to the outer tip 16 of each blade 14. A knuckle 20 is secured to the outer perimeter ring 18. Each knuckle 20 includes a curved surface 22 constructed and arranged to be forcefully presented to the aquaculture net upon rotation of the blade 14 for removal of growth by impact and shaking of the aquaculture net.

Lower tensioned net loads with the described technology is analogous to a base guitar where strings move easily and far when compared to standard guitar or banjo where movement is very low with the same force and movement is far less. The knuckle design of the instant invention is designed to play the standard guitar versus the base guitar. The cleaning of nets with the new knuckle design results from impacting hard growth by cleaning knuckles, friction on net twine and aggressive shaking of the net to remove soft growth. The energy required to do this without net damage is a function of the net or twine tension and the angle of the moving knuckle, the speed and the distance pushed.

The Lindgren disclosure WO 2016/183274 A1 works well with low tension nets. However, with high tension large mesh nets the net is much more difficult to shake and move distant from normal positions. The forces are a geometric function being the sine or cosine of the angle of the knuckle to compare the forces paralleled to the face of the net versus perpendicular to the face of the net. To reduce the force on the net and torque requirement of the equipment and clean well requires a curved surface to change the angle as the net is moved to keep the forces more constant than can be achieved with a straight surface.

FIGS. 3 and 4 depict a preferred knuckle 20 having a curved surface 22 on a leading edge and compound angle trailing edge 24. Apertures 26 and 28 allow for receipt of fasteners 30 and 32. The centerline 34 is illustrated as about 0.375" from the center of the apertures 26, 28. The knuckle 20 is more net friendly, reduces power requirement and improves equipment life. This knuckle 40 embodiment having a length of about 2.086". The design is symmetrical to operate in clockwise or counterclockwise direction and can be reversed if worn.

Figure 7:
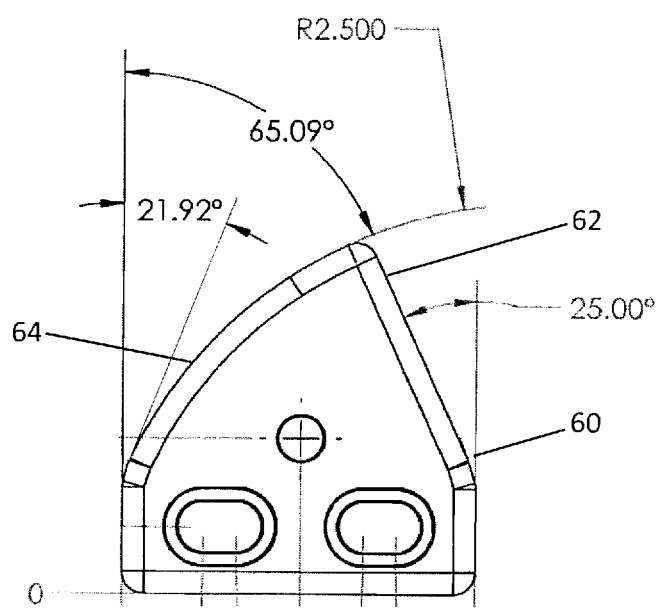
FIG. 7 is a front plane view of a third embodiment knuckle.
Figure 8:
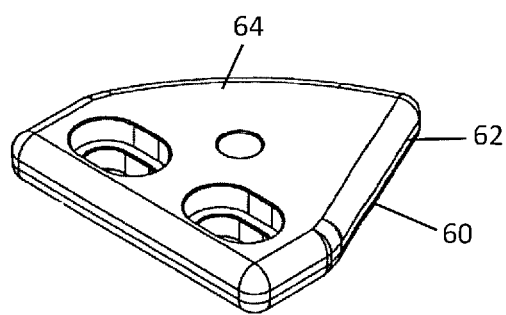
FIG. 8 is a perspective view of FIG. 7.
Figure 10:
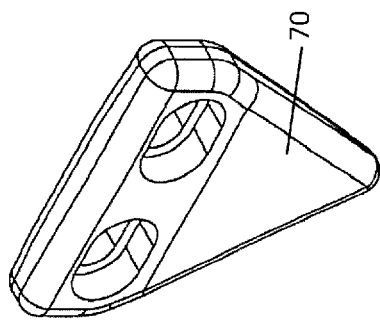
FIG. 10 is a perspective view of FIG. 9.
Figure 11:
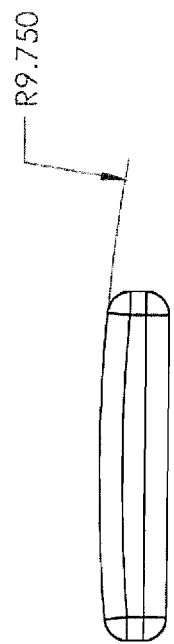
FIG. 11 is an end view of FIG. 9.
Figure 9:
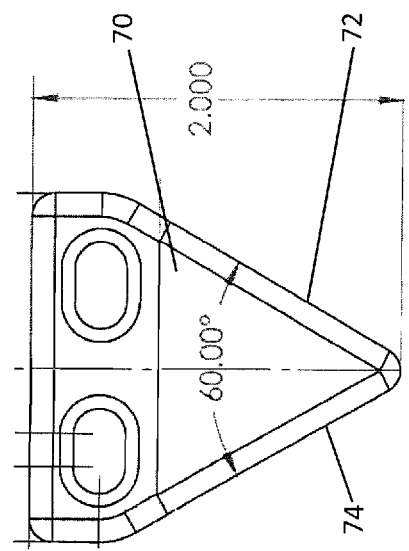
FIG. 9 is a front plane view of a fourth embodiment knuckle.
Figure 13:
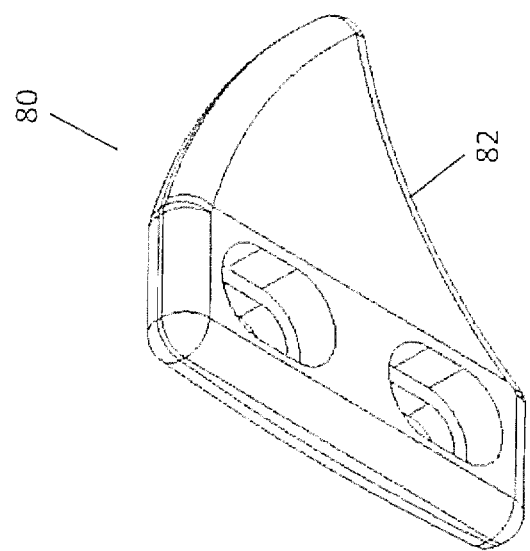
FIG. 13 is perspective view of 12.
Figure 12:
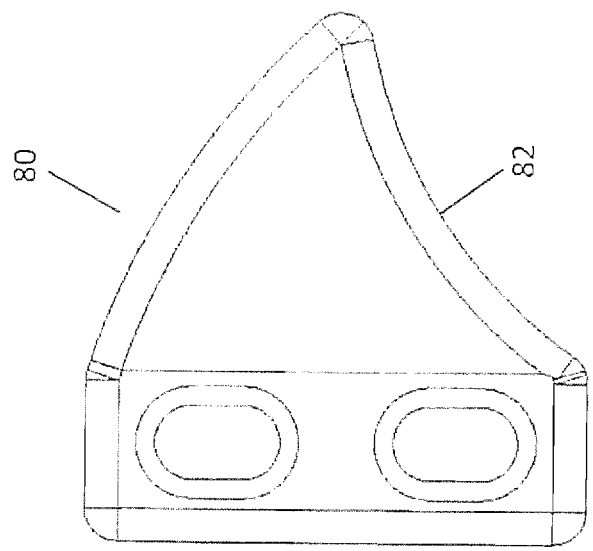
FIG. 12 is a front plane view of a fifth embodiment.

FIGS. 5 and 6 depict a knuckle 40 having a symmetrical edge surfaces 42, 44 with a centerline 46 illustrated as about 0.375" from the center of the apertures 48, 50. This knuckle 40 embodiment having a length of about 1.802". FIGS. 7 and 8 depict a knuckle 60 having non symmetrical edge surfaces 62 and 64. Edge surface 62 having an angle of about 25 degrees, rear edge surface 64 having a compound angle slightly more than 65 degrees. FIGS. 9-11 depict a knuckle 70 having symmetrical edge surfaces 72, 74 of about 60 degrees. The length is about 2.0" and the curvature of the knuckle provides a radius of about 9.75. Excluding friction the forces on the net. FIGS. 12 and 13 depict a knuckle 80 with a rapidly sloping curved edge 82 and rearward curved edge 84. This embodiment provides faster net strand return that can improve cleaning on very tight nets at the expense of an efficient reverse that is can be used to move more easily or untangle kelp, ropes and other fouling.

Forces from the cleaning knuckle can be compared by calculating as follows:
Parallel to net face=force (cosine angle)
Perpendicular to net face=force (sine angle)
Table 1
  Angle from centerline Cosine Sine
  22 degrees 0.927 0.374
  30 degrees 0.866 0.5
  65 degrees 0.406 0.906

Maximum torque for a propeller in this type of net cleaner is 50 to 100 ft. lbs. with approximately 30% of the power delivered to the propeller blades 70 lbs. force is remaining for typically 8 cleaning knuckles or 8.75 lbs. per knuckle. Single angle knuckles typically have an angle of around 30 degrees from centerline.
Table 2
Single angle Force parallel Force perpendicular
30 degrees to net to net
Curved angle 4" radius 7.6 4.4
Lower curve 22 deg. 8.1 3.3
Upper curve 65 deg. 3.6 8.4

Shown in Table 2 is how dramatically the forces parallel and perpendicular the net change as the knuckle moves on the net strand. The curved angle knuckle can provide high forces to move the aquaculture net parallel to the net face and then shift to high push perpendicular to the net for maximum movement with less torque. This is not possible with a single angle.

The existing designs were symmetrical commonly with an acute angle to centerline of approxinlately 30 degrees. Because of the low angle on the downstream side recovery of the twine is fast and also shakes off fouling. With the advance invention of the curved knuckle the downstream side can have inhibited return recovery at low rotational speeds causing less cleaning power of the twine not quickly returning to position rapidly. The solution is a more acute or straight angle on the downstream side. Sometimes the propellers are run in reverse to untangle or reposition the cleaning head. The downstream angle must not be so acute to prevent reverse rotation of above below 20 degrees. When in reverse the propellers quickly move the cleaning head off the net and only a small angle is required. The current invention increases efficiency and rotational speeds for better cleaning.

Figure 14:
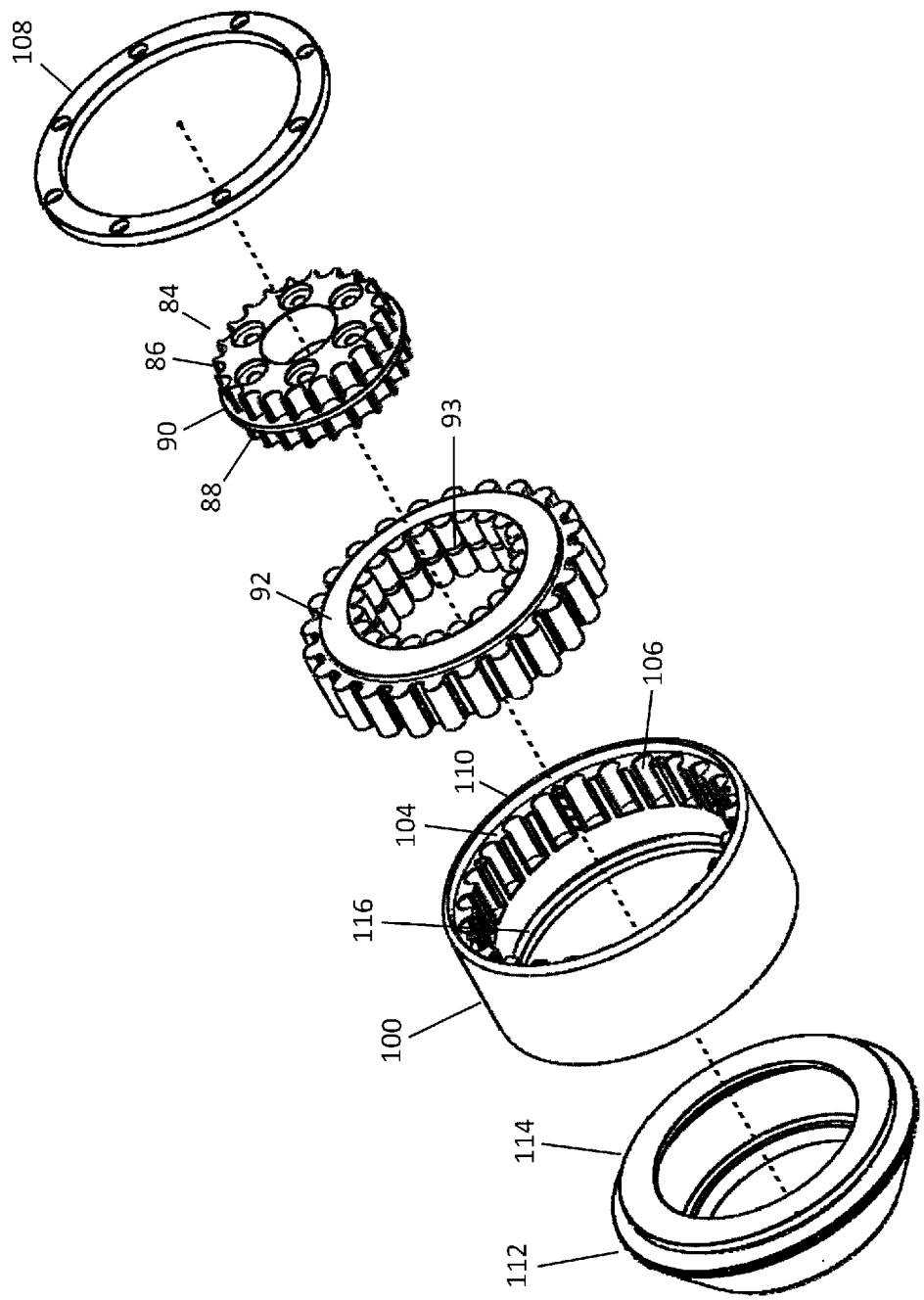
FIG. 14 is exploded view of the elastomeric hub.
Figure 15:
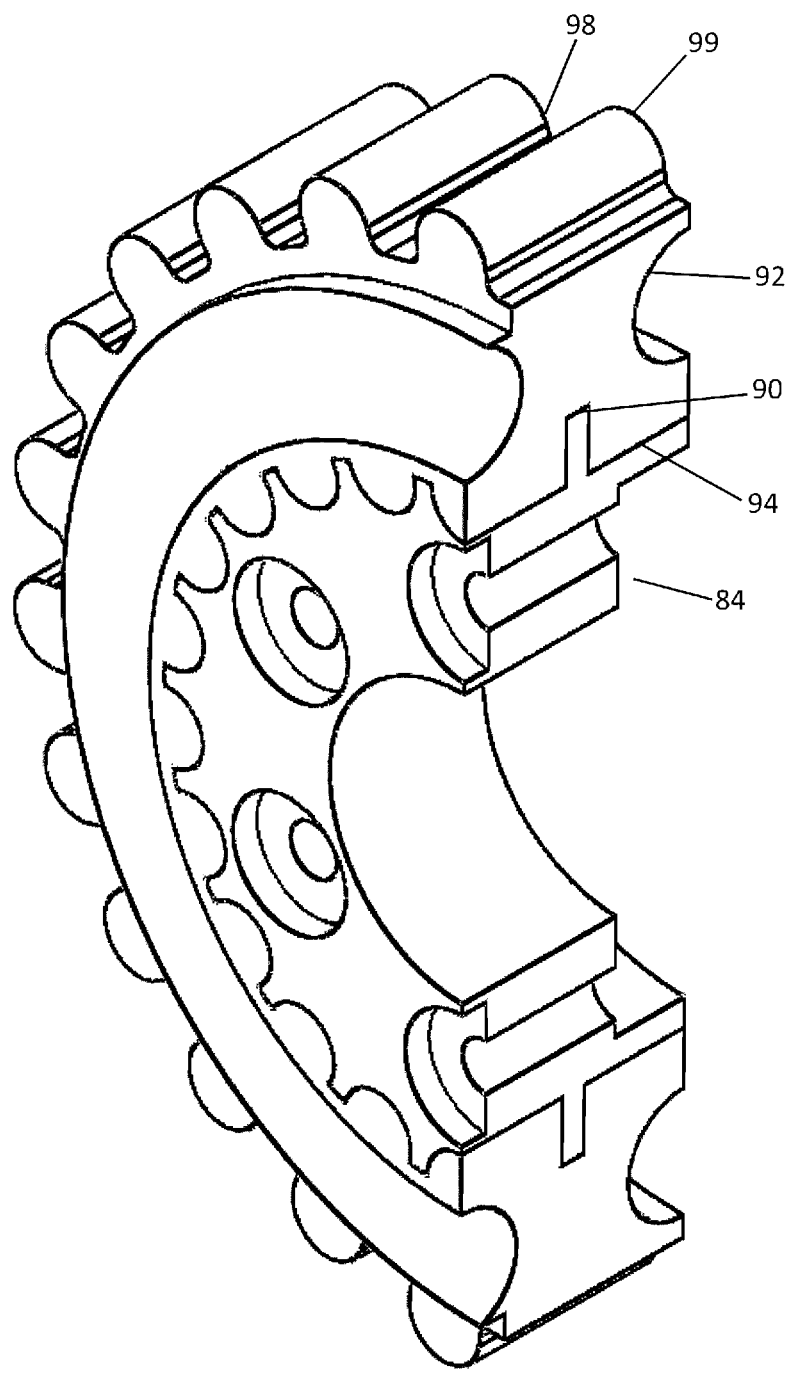
FIG. 15 is a cut away view of the elastomeric hub.

Referring to FIG. 14, illustrated is an exploded view of the elastomeric hub 12 which forms a flexible drive coupling to facilitate the use of the knuckles. The elastomeric hub operates as a shock absorber to lessen impact damage to the knuckles when removing aged barnacles or other hard growth that would otherwise case spike loads. The elastomeric hub 12 consists of a driver 84 having a plurality of splined shaped formations 86, 88 positioned around the diameter of the driver 84 on each side of a centrally disposed guide wall 90. In the preferred embodiment, the driver 84 is formed from a rigid material such as aluminum, delrin or the like. A elastomeric body 92 is over molded to the driver 84 wherein the splined shaped formations 86, 88 maintain the elastomeric body 92 from rotating separately from the driver 84. Similarly, the guide wall 90 which extends outwardly from the splined formations 86, 88 prevents the elastomeric body 92 from detaching from the driver 84. In the preferred embodiment the elastomeric body 92 is a urethane elastomer. While the inner surface 94 of the elastomeric body 92 is molded to the splined formations 86, 88, and outer surface 96 has a plurality of concave sections formed from valleys 98 and peaks 99 along the outer surface 92. The elastomeric hub 92 is constructed and arranged to prevent spike loads in a rotational direction and parallel to the rotational axis of the propeller simultaneously. The elastomeric body 92 also referred to as a flexible element 92 preferably with a durometer between 70 and 90 A shore hardness, the I.D. and O.D. of the elastomeric body 92 and mating surface 93 are splined. A base 100 of the hub 12 has an inner surface 104 having concave sockets 106 for receipt of the valleys 98 and peaks 99 of the elastomeric body 92. The outer shell preferably constructed from aluminum for support of the blades 14 and outer perimeter ring 18. A coupling ring 108 secures the driver 84 within the base 100, the coupling ring 108 may be secured along a groove 110 formed along an edge of the base 100. A protective shield 112 is securable to the base 100 having a lip 114 for securement along edge 116 of the base.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A aquaculture net cleaning system comprising; at least one propeller housing with a centrally disposed elastomeric hub with a plurality of blades extending therefrom; an outer perimeter ring secured to an outer tip of each said blade; a plurality of triangular shaped rigid knuckles having a forward surface and a trailing surface forming two opposed convex edges and a base secured to said outer perimeter ring, wherein each said forward surface is constructed and arranged to be forcefully presented to an aquaculture net upon rotation of said blades; wherein rotation of said blades provides thrust for positioning said knuckles against the aquaculture net positioned underwater whereby said knuckles remove fouling from the aquaculture net by causing the aquaculture net to ride up said forward surface of said knuckle and down said trailing surface of said knuckle and upon the aquaculture net traversing said knuckle the aquaculture net returns to position allowing for removal of growth by impact and shaking the aquaculture net.

2. The aquaculture net cleaning system according to claim 1 wherein angles measured from tangent to said forward surface from said base of said knuckle changes from 20 degrees to over 45 degrees.

3. The aquaculture net cleaning system according to claim 1 wherein said forward surface approximates a radius of over 2 inches.

4. The aquaculture net cleaning system according to claim 1 wherein said forward surface of said knuckle is about 30 degrees from a centerline of said base wherein about 30% of the power to said propeller system is directed to said blades and about 70% to said knuckles.

5. The aquaculture net cleaning system according to claim 1 wherein said forward surface of the knuckle is over 66 degrees measured from perpendicular to the propeller rim and tangent to said forward surface.

6. The aquaculture net cleaning system according to claim 5 wherein said forward surface is unsymmetrical and said trailing surface is relieved to allow faster net recovery.

7. The aquaculture net cleaning system according to claim 1 wherein said forward surface has about a 22 degree angle from a centerline of said base with a 0.927 cosine angle and a 0.374 sine angle said forward surface is calculated by a cosine angle parallel to a net and a sine angle perpendicular to the net.

8. The aquaculture net cleaning system according to claim 1 wherein said forward surface has about a 30 degree angle from a centerline of said base with a 0.866 cosine angle and a 0.5 sine angle of said forward surface is calculated by a cosine angle parallel to a net and a sine angle perpendicular to the net.

9. The aquaculture net cleaning system according to claim 1 wherein said forward surface has about a 65 degree angle from a centerline of said base with a 0.406 cosine angle and a 0.906 sine angle of said forward surface is calculated by a cosine angle parallel to a net and a sine angle perpendicular to the net.

10. The aquaculture net cleaning system according to claim 1 wherein said forward surface is constructed and arranged to apply about 7.6 lbs. of force parallel to the aquaculture net and about 4.4 lbs. of force perpendicular to the aquaculture net.

11. The aquaculture net cleaning system according to claim 1 wherein said knuckles are not symmetrical.

12. The aquaculture net cleaning system according to claim 1 wherein said knuckles have a length of less than 2 inches and are removably fastened to said perimeter ring.

* * * * *